Nov. 7, 1967   R. S. BUSHNELL   3,350,793
AUTOMATIC CARD RATING AND TEACHING MACHINE
Filed Dec. 20, 1965   4 Sheets-Sheet 1
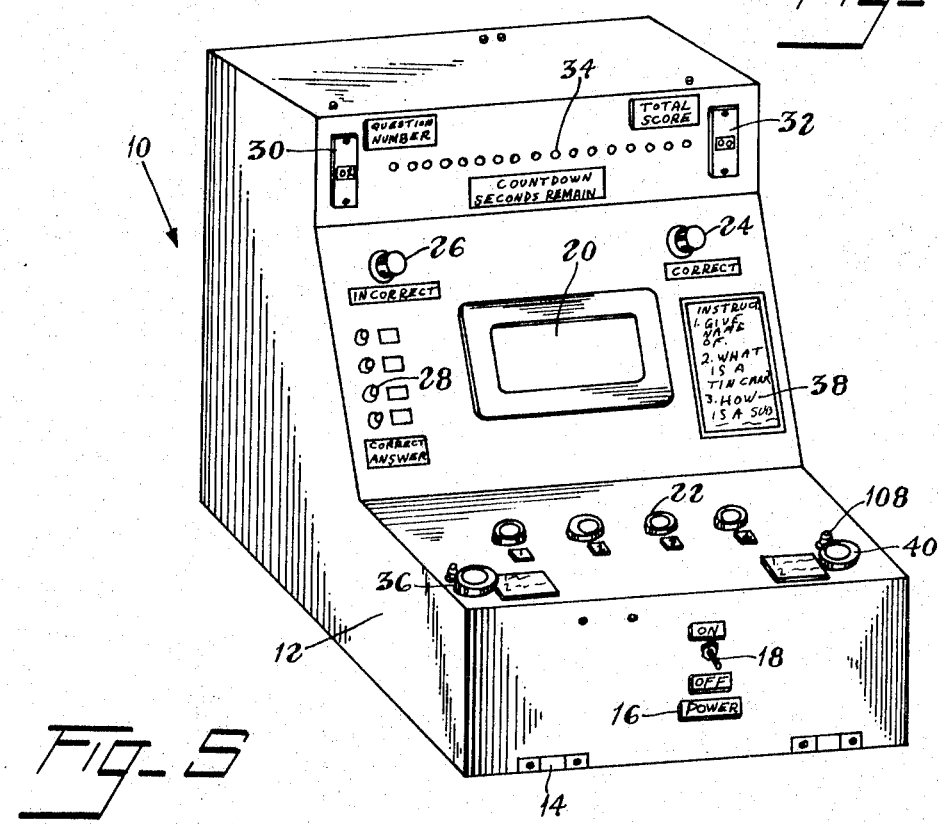
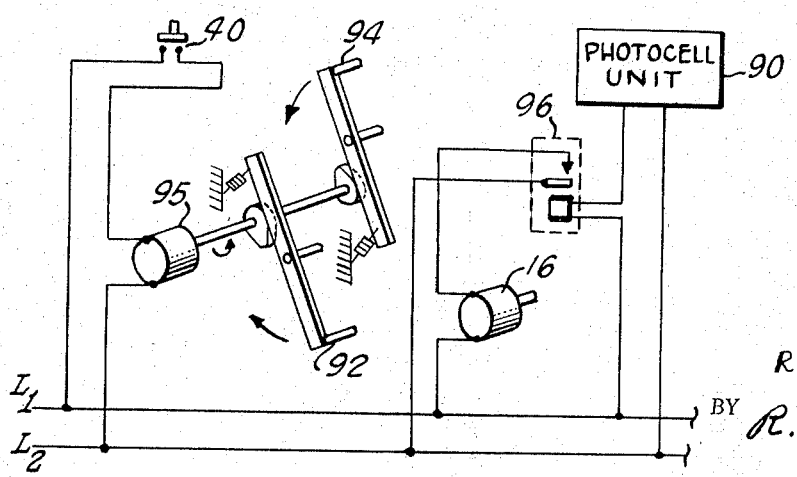
INVENTOR.
RUSSELL S. BUSHNELL
BY R. S. Tompkins
ATTORNEY

INVENTOR.
RUSSELL S. BUSHNELL

BY R. S. Tompkins

ATTORNEY

INVENTOR.
RUSSELL S. BUSHNELL
BY R. J. Tompkins

ATTORNEY

INVENTOR.
RUSSELL S. BUSHNELL
BY
R. J. Tompkins
ATTORNEY

United States Patent Office 3,350,793
Patented Nov. 7, 1967

3,350,793
AUTOMATIC CARD RATING AND TEACHING MACHINE
Russell S. Bushnell, 42 Riverside Drive,
New York, N.Y. 10024
Filed Dec. 20, 1965, Ser. No. 515,258
3 Claims. (Cl. 35—9)

ABSTRACT OF THE DISCLOSURE

A self scoring tutoring device for sequentially displaying a plurality of cards each having a question and multiple choice answers, the device including transfer means for taking cards from a stack, spacing the cards, delivering them singly to a waiting position and then to a viewing position where the question is read by a student who presses a button corresponding to a chosen answer, thereby conditioning the device to tally a numerical score based on speed and correctness of the answer, the transfer means includes belts, accelerating and spacing rollers, stop means, a gravity slide, and a plurality of retractable holding means for retaining cards in waiting and viewing positions during the delivery sequence.

---

This invention relates to self-scoring testing machine devices and more particularly to a device which is capable of providing an informal method of self-teaching or self-rating for trainees as an adjunct to classroom instruction. Preferably this will be in the form of an automatic rater.

Prior self-tutoring devices were very often prohibitively expensive to purchase and to maintain. One frequent cause of failure was because the cards, which were normally stocked for sequential operation, jammed up and the machine had to be repaired. The scoring means sometimes did not coordinate with the answers and incorrect scores were totaled. These problems have been overcome in the instant invention by the use of a special belt and roller system which cooperates with a photocell lamp arrangement to insure the sequential transmittal of each quiz card into view of the student, while at the same time the next card is brought into a waiting position.

The device of the invention displays multiple-choice questions, preferably on 3-by-5-inch index cards, in the viewing window on its sloping front panel. Each card contains one question and four multiple-choice answers, numbered 1, 2, 3 and 4, respectively. The front panel of the device contains four numbered "answer" pushbuttons, four "correct answer" lamps, a green "correct" lamp and a red "incorrect" lamp. When the selected answer is correct, the "correct" (green) lamp lights and a bell sounds. When an incorrect answer is selected the "incorrect" (red) lamp lights and a buzzer sounds, one of the four "correct answer" lamp lights, indicating the correct answer. A free-time interval, usually five seconds, is allowed for reading each question. If the trainee answers the question correctly within this "free time," he receives a perfect (maximum) score of 20 points for the question. Immediately after this free-time period twenty "countdown" lamps, located along the top of the panel, go out one at a time from right to left, at 1-second intervals until an "answer" pushbutton is pressed. The obtainable score is reduced by one point for each lamp that goes out. The score is recorded on the "total score" counter. For every question, therefore, the device automatically records the trainee's score, based not only on the correctness, but also on the speed of selection of the answer. The number of question cards played is recorded on the "question number" counter while the trainee's score is cumulatively tabulated on the "total score" counter. When the "question number" counter registers a total of ten cards played (one complete game), the device must be reset by pressing the "reset" pushbutton before a new ten-question card game can be started.

It is an object of the invention to provide a self-teaching device for trainees which may, in an informal manner, supplement the formal classroom instruction. It may be used to impart specialized knowledge and skills required for specific jobs, and may be used with equal facility as a refresher trainer.

It is another object to prevent jamming or skipping of cards and to insure the faultless delivery of one card at a time to the reading area.

It is yet another object to provide a device which is capable of holding and feeding through the machine a few or many cards so that a short quiz could be effected, or a series of quizes to test overall knowledge could be provided.

It is still yet another object to score the trainee at the time he answers a question, with the score taking into consideration the time required to both read and to select an answer.

And it is a feature of the invention to utilize a plurality of endless belts and rollers so positioned in relation to each other, that cards that may be overlapped are separated from each other to insure the delivery of only one card at a time to the viewing window.

It is a feature of the invention to provide a photoconductive cell which cooperates with stop means to bring a card into the viewing window and to thereby control the feeding process for the next card.

Other objects and many of the attendant advantages of this invention will be readily appreciated as the same becomes better understood by reference to the following detailed description when considered in connection with the accompanying drawings wherein:

FIG. 1 is a perspective view of the portable tutor device of the invention;

FIG. 5 is a schematic illustration of the belt drive motor and pin retraction control circuitry.

Figure 2:
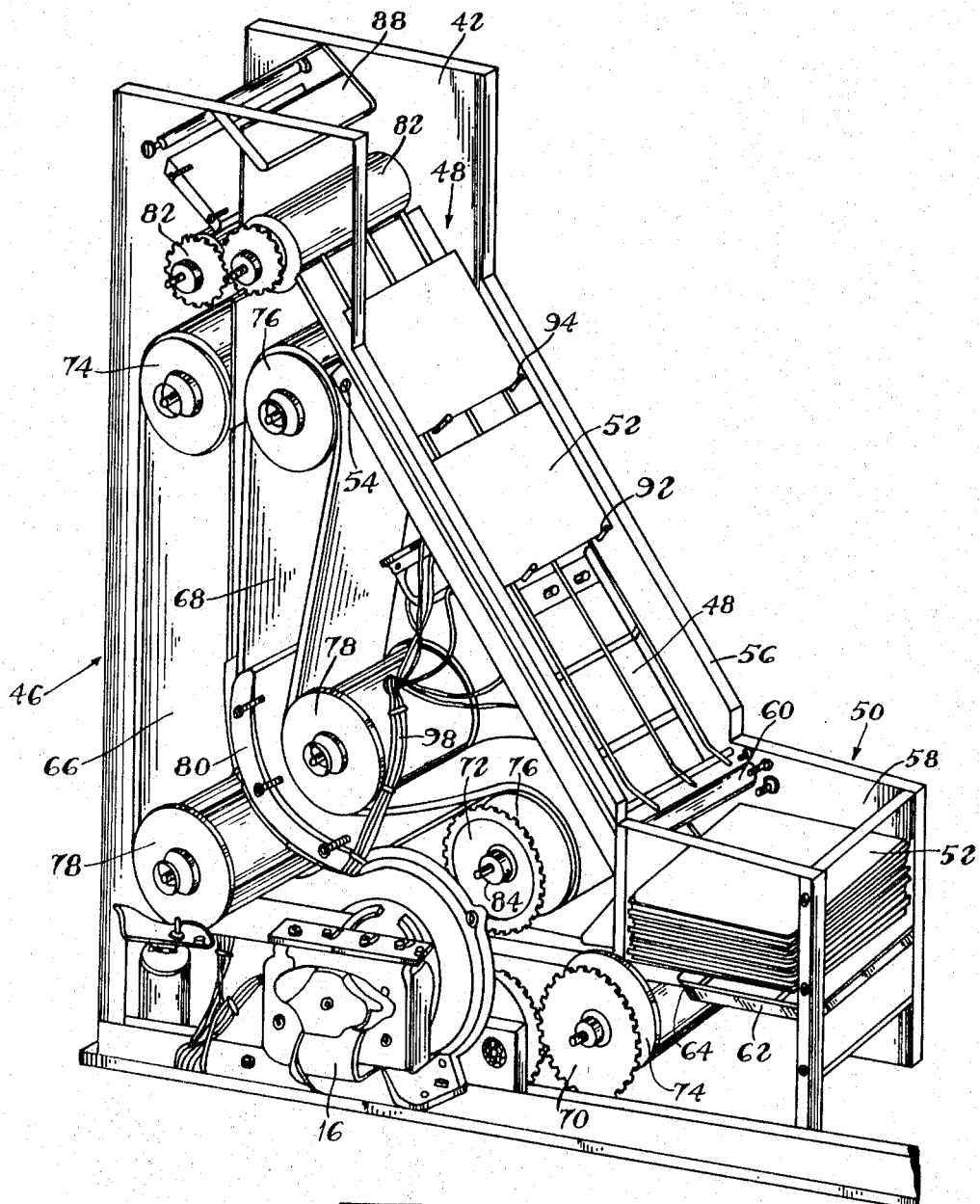
FIG. 2 is a side view of one form of the invention with the outer casing removed.

Referring to the figures and to FIG. 1 particularly, selfgrading tutor 10 may be in the general shape of a cash register and is portable so that it may be located in any desired place. When used in the military activities, it may be readily utilized at any shore installation or in ships at sea. The outer casing or cover 12 is hinged at 14 to allow the casing to pivot forward and to thereby provide ready access to the interior thereof. This permits ease in repair and maintenance of the equipment.

Power to the device is controlled by the "on-off" switch 18. When a card has been positioned in the window 20, the trainee reads it as quickly as possible and selects the answer from those in a multiple choice relation that he thinks is correct. At this point he will depress the answer button 22 of his choice. If the answer is correct, the "correct" light (green) 24 will light up. If the answer selected is incorrect however, the "incorrect" (red) light 26 will light up. At the same time the proper answer will light up in the "correct answer" light 28. Since the quizes are normally in a series of ten questions, the question number will appear in the device at 30, while the total score will appear in the score window 32. A plurality of "countdown" lights 34 are provided and are so timed that after a preset time for reading the question, the lights will go off in sequence until the answer button 22 is actuated, or until all of the twenty lights depicted go out. When the answer button 22 is operated to stop the countdown lights and the answer is correct, the score added at 32 will equal only the total of those lights that are still lit up. Of course, if the twenty countdown lights have all gone out, no score will be realized even if the answer is correct. A reset button 36 is also actuated when the specific quiz is completed and a new quiz is to be instituted. If desired, an instruction panel 38 may be provided for the trainee. The card change button 40 is utilized to withdraw the pins (to be later described) which retain the card in the window 20 and to actuate the mechanism so that the next card will move into view.

Figure 3:
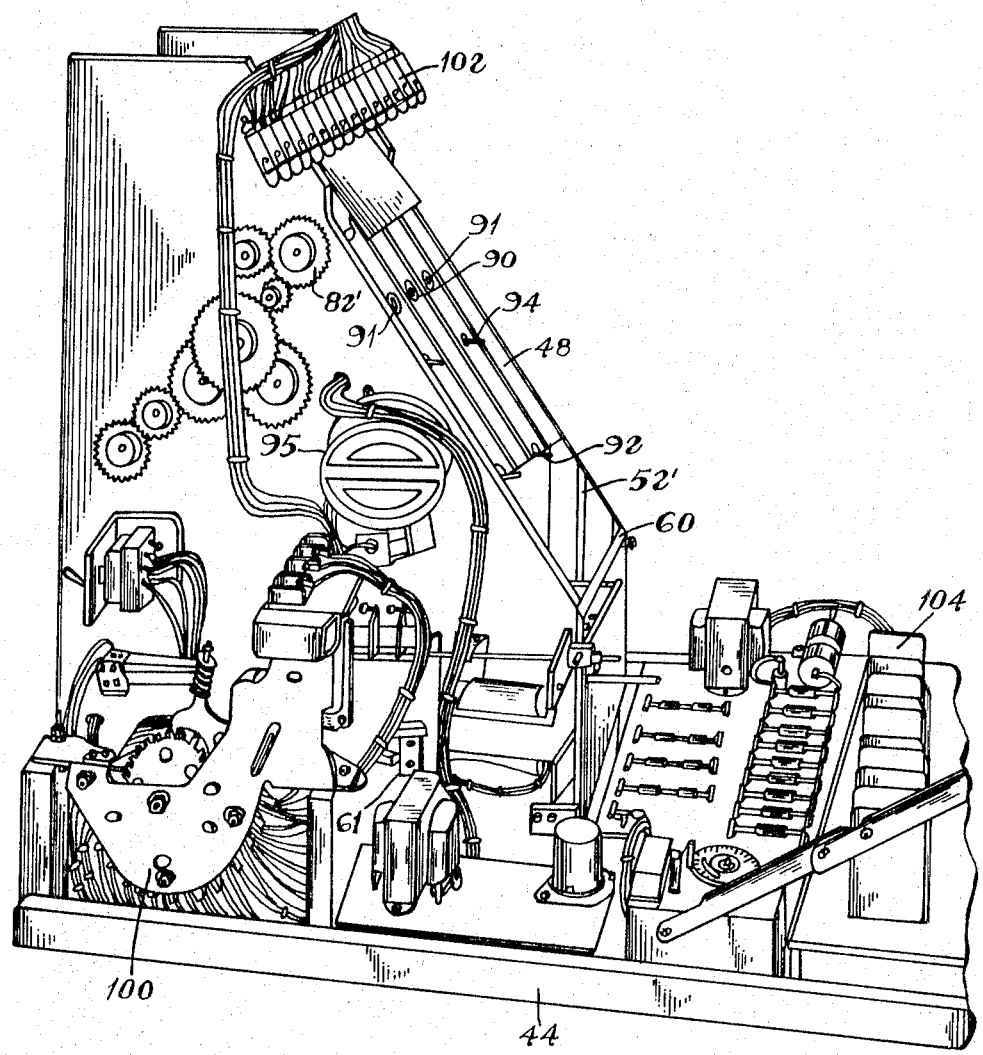
FIG. 3 is a perspective view of another form of the invention with the quiz cards removably stacked in relation to the carrying belts clearly illustrated.
Figure 4:
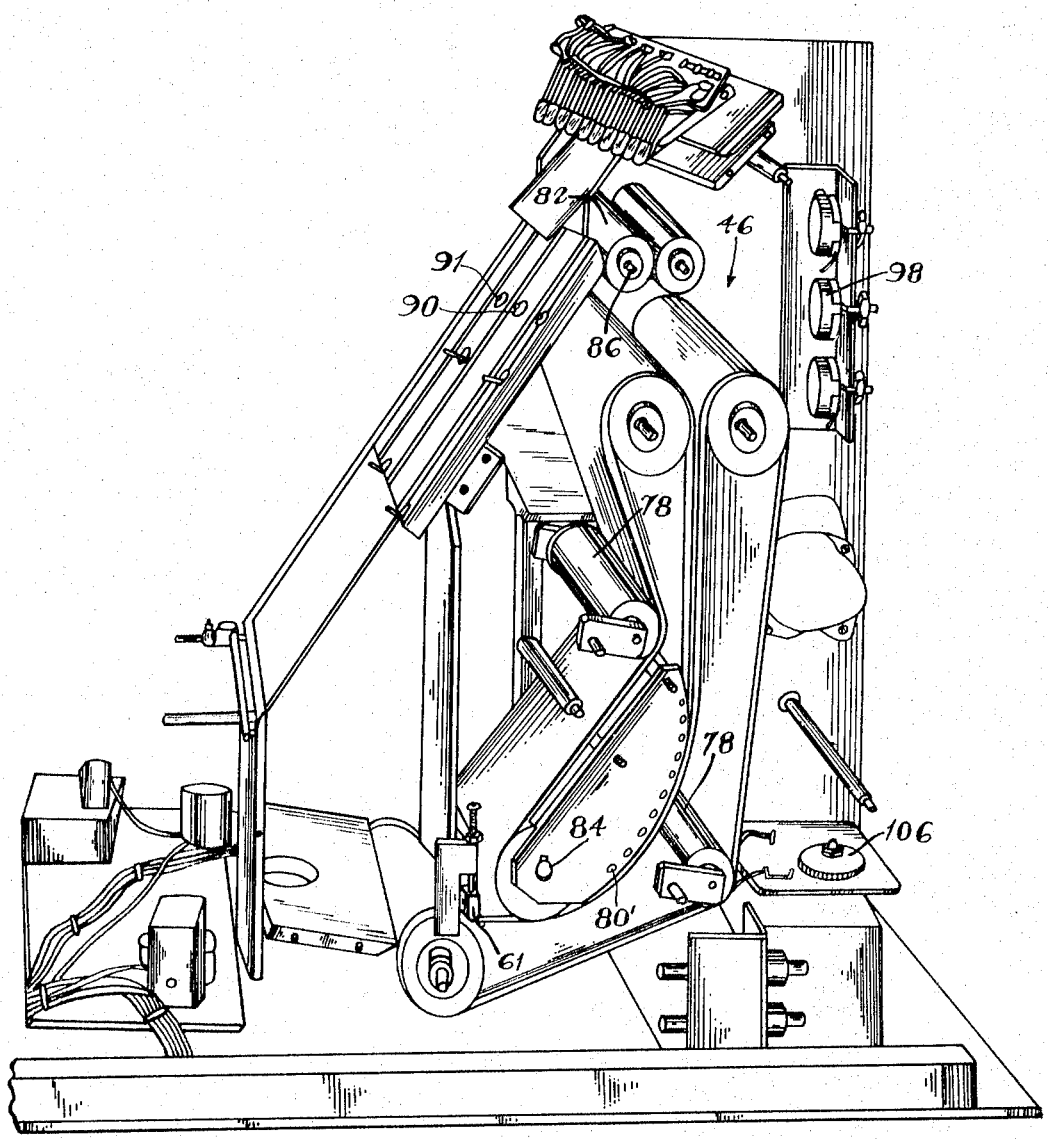
FIG. 4 is a perspective view generally similar to that shown in FIG. 3, but as seen from the opposite side.

Referring to FIGS. 2, 3 and 4, the invention is depicted with the outer casing 12 removed and the mechanical portion of the device consisting of two upright panel members 42 mounted on a base plate 44. An endless belt and roller assembly 46 is mounted between the panel members and base plates as is illustrated in the figures. A card slide surface 48 is positioned at an incline and overlying the belt and roller assembly 46 and is abutted in operative positions at its lower end by the card holding and feeding mechanism 50. The card storage bin is positioned adjacent to the slide surface to receive the cards and may be so constructed that it may be removed and a number of quiz cards 52 supplied thereto, as seen in FIG. 3, or may be integrally a part of the surface 48 at 52 as shown in FIG. 2. It should be noted that the card slide surface 48 is secured at 54 to the panel members 42 in such a position that the inclined surface 56 thereof extends slightly above the card surface 48 to provide guide rails for the cards 52 as they travel downwardly.

The quiz card storage bin 50 is provided with four vertical sides 58 of a width approximately the same width of the cards 52. The upper surface is open in order to receive the cards as they slide down the inclined surface 48. Means at 60 (see FIG. 3) and means 60' (see FIG. 2) are provided the slide 48 and serve to prevent the cards 52 from tumbling over when they reach the storage bin 50. The bottom surface 62 of the bin 50 does not extend quite across to the opposite side, but is provided with an inclined surface or edge 64 which rests on the bottom roller of the belt assembly 46. Since the coefficient of friction between the bottom card and the belt is extremely high, the belt when it is moving will draw the bottom card from the stack of cards resting in the storage bin 50. As the coefficient of friction between this bottom card and the card above it is very low, only slight pressure from the retarding strip 61 is necessary to hold back the second card. As the first card passes from beneath the second card, the second card comes into contact with the belt, the holding friction of the retarding strip is overcome and the card follows the previous card. The belt and roller assembly consists of a pair of endless belts 66 and 68 so positioned that a large portion of their surfaces are contiguous to each other serve to move the cards into the waiting position on pins 94. The motor 16, when started, drives a number of gears 70 and 72 so that belts 66 and 68 travel simultaneously. The gear 70 rotates the roller 74 while the gear 72 rotates the roller 76. The tension rollers 78 serve to keep the endless belts taut at all times. A guide surface 80 is fastened to the panel members 42 and serves to carry the belts 66 and 68 through the 90 degree turn.

Adjacent to but located and spaced above the belt members 66 and 68 are the separation rollers 82 and 82' (see FIGS. 2 and 3). These rollers 82, 82' are smaller in size than the rollers 74 and 76 and rotated much more quickly. These may be driven by chain means or by gears to attain such high speed. Thus, the rollers 82 are driven at the same time as the rollers of the endless belt members 66 and 68 are actuated. In FIG. 2, the drive gear and the endless chain members are hidden from view. The rate of surface speed between that of the rollers 86 and the belt members is approximately ten times as great. A sloping stop plate 88 is mounted above the rollers 82 and serves to halt the upward movement of the card 52 while tilting the card so that it will then begin to fall and slide down the inclined surface 48.

As is readily apparent from FIGS. 3 and 4, a plurality of photocell units 90 and 91 are located on the upper portion of the card slide surface 48. The photocell units 90 and 91 are each of the commercially available type including both a light source and a light sensing element contained in a single unit with suitable prismatic and shielding means so that when a reflective surface such as a white or other light colored card is positioned in front thereof, light from the source is reflected back to the light sensing element to provide an electrical response. Two pairs of retractable pins 92 and 94 are mounted on the slide surface 48 and are momentarily retracted in sequence by a conventional single revolution, cam operating motor means 95 upon pushing the card change button 40. As shown in FIG. 5, pushing the card change button completes a circuit which may be traced from a power line $L_1$ through a switch operated by the button 40, and through the cam operating motor means 95 to a power line $L_2$, the lower pair of pins 92 thereby being operated to retract first and then followed by the second pair 94. As the lower pins 92 retract, the card 52 which is in a viewing position in the window 20 slides down and is returned to the top of the stack in the card storage bin 50. As the upper pins retract, a new card slides into position in the viewing window. This card has been maintained on the upper pins 94. This causes the photocell unit 90 to be uncovered and the motor 16 now starts, turning the belt and roller members to bring a new card into the waiting position on the pins 94. As shown in FIG. 5, the photocell unit 90 controls energization of a relay 96 which is energized when light is reflected back to the photocell unit by presence of a card at the waiting position. When the waiting position is vacated, the relay 96 is deenergized, and the contacts thereof complete the energizing circuit for motor 16. When a new card falls into the waiting position on pins 94, light is reflected to the photocell unit 90, the relay 96 is energized, and the motor 16 driving the belts is halted. The two outer photocell units 91 react to set up the correct answer through light reflected from the rear surface of the card. By blacking the back of the card (so it does not reflect): (1) above the left photocell unit; (2) above the right photocell unit; (3) above both photocell units and (4) above neither photocell unit, four combinations for the four answers are obtained. The means to adjust the sensitivity of response of the photocell units is provided at 98.

After the card change button 40 is pressed, a new question card drops into viewing position at 20 by the action of the pins 92 and 94. A time interval, usually of five seconds, is permitted for the trainee to read the next question. As is shown in FIG. 3, a stepping switch 100 advances one step at a time for every one second interval that the trainee takes to answer the question. As the stepping switch is so advanced, the countdown lamps 34, which are connected in series, extinguish sequentially from right to left, until the answer pushbutton is pressed or until all twenty lamps are extinguished. In this way a score may be obtained. The necessary relays 104 and circuitry is provided and forms no part of the instant invention. The desired countdown time interval may be adjusted within a range of about ten or fifteen seconds and the means to do so is provided at 106.

The operation of the device is as follows. The reset button 36 is actuated to return the question counter 30 and the score counter 32 to the zero position. A lamp 108 over the card change button 40 is lit to indicate that the device is ready to be operated. When the card change button is actuated the solenoid or cam is energized retracting pins 92 and dropping the card in the viewing window 20 (from previous game) into the storage bin 50. The first card in the next game then drops from the upper position on the pins 94, as shown in FIG. 3 to the lower position on the pins 92, since the pins 94 have followed and retracted. As the photocell unit 90 is thus uncovered the endless belt and roller assembly 46 is operated by the energization of the motor 16 to bring a new card into position against the pins 94, thereby reflecting light back to the photocell unit 90 and causing the motor 16 to stop. At the lower end of the belt the lowermost card 52 in the card storage bin 50 is pulled by the belt member 70. Since the friction between the bottom card and the belt is very high and the cards are normally calendered, a single card will be removed. The retarding strip 61 helps to hold back the next card. When the next card (which has now become the bottom card) comes into contact with the belt the holding friction of the retarding strip is overcome and the card follows the preceding one. A continuous series of cards is thus carried upward vertically between belts 66 and 68 to the separation rollers 82. These rollers because of their higher speed pluck a card from the belts and feed it upwardly till it is stopped by the plate 88 and it then falls onto the inclined surface 46.

Answer coding is read from the back of the card in the upper position by the photocell unit 91 and retained in memory relays when the card is dropped into the viewing position.

A five-second reading time is usually permitted after which the twenty countdown lights 102 then go out sequentially from right to left at the rate of one lamp per second. At any time before all twenty lamps go out, the answer button 40 may be actuated. If the correct answer lamp 24 lights, indicating that a correct answer has been given the score is registered on the total score counter 32. This score will depend on the number of countdown lamps lit. Thus for example, if the correct answer is selected for the first question after fifteen lamps go out (therefore fifteen seconds have elapsed), the score registered on the total counter is five. If a correct answer is selected before any of the twenty countdown lamps go out, a maximum score of twenty is registered on the total score counter. However, if an incorrect answer button is pressed, the incorrect lamp 26 lights and no score is then registered. No score is registered also if all of the twenty lamps 108 have gone out before the answer button is pressed. In any instance, the correct answer is indicated at 28 on the rater 10.

The change card button 40 is again pressed, and the cycle is repeated for all questions. In this manner a single card is always available for the student or trainee. The old conditions wherein several cards would be moved along together at the same time is avoided. Even if two cards are pulled out from the bottom of the stack by the belt 66, one will always be slightly behind the other. Thus, when this slightly advanced card reaches the rollers 82, it will be separated from the other card at a multiple rate of speed so that only a single card reaches the stop member 88 and then slides down the member 48. Any sort of material may be utilized in constructing the device which is capable of operating faultlessly and for long periods of time without maintenance.

Obviously many modifications and variations of the present invention are possible in the light of the above teachings. It is therefore to be understood that within the scope of the appended claims the invention may be practiced otherwise than as specifically described.

What is claimed is:
1. A tutor device comprising:
storage means to retain a plurality of stacked quiz cards;
first transfer means comprising first and second endless, movable belts and motor means for driving said belts, said first belt having a portion engageable by the lowermost of said stacked cards for frictionally withdrawing said lowermost card from said storage means, said first belt having a vertically extending portion;
a retarding strip disposed between said first belt and said storage means and frictionally opposing withdrawal of more than one of said cards at a time;
said second movable belt having a vertically extending portion disposed in contiguous relation to said vertically extending portion of said first belt, said vertically extending portions both moving upwardly and cooperating to grip and move upwardly a withdrawn card;
second transfer means comprising a pair of oppositely rotating rollers disposed above said vertical, contiguous portions of said first and second belts so as to receive and grip cards moved upwardly by said belts, and means for driving said rollers at a speed greater than the speed of said belts, whereby said rollers cooperate to accelerate and space said cards in their upward movement;
a sloping stop member disposed above said second transfer means and in the path of accelerated, upwardly moving cards, said sloping stop member being operative to tilt each card and stop the upward movement thereof so that each tilted card will thereafter fall downwardly under the influence of gravity;
a card slide member having an inclined surface, the upper end of which is adjacent one of said rollers in a position to slidingly receive each card as it falls downwardly from said stop member;
first retractable holding means on said card slide member for interrupting sliding movement of a card down said slide member and holding that card in a waiting position;
second retractable holding means below said first holding means on said slide member for interrupting sliding movement of a card and holding that card in a viewing position below said waiting position;
means for momentarily retracting said second holding means to permit a card to slide from said viewing position to said storage means, and for subsequently momentarily retracting said first holding means to permit a card to slide from said waiting position to said viewing position; and
photocell means responsive to presence of a card at said waiting position to interrupt operation of said motor means for driving said first and second belts.

2. A tutor device as defined in claim 1, and wherein:
said means for momentarily retracting said holding means comprises a manually operable switch, and electrically operated motor means energizable thereby.

3. A tutor device as defined in claim 2 and further comprising:
housing means defining a window positioned to permit viewing a card in said viewing position;
said housing means preventing viewing of a card in said waiting position.

References Cited
UNITED STATES PATENTS

| | | | |
|---|---|---|---|
| 2,467,423 | 4/1949 | Bruker | 271—69 |
| 2,522,226 | 9/1950 | Hood | 40—36 |
| 2,936,170 | 5/1960 | Herrick et al. | 271—12 |
| 3,187,442 | 6/1965 | Hertsche | 35—9 |

EUGENE R. CAPOZIO, *Primary Examiner.*

R. W. WEIG, *Assistant Examiner.*